(12) United States Patent
Schoener et al.

(10) Patent No.: US 6,348,121 B1
(45) Date of Patent: Feb. 19, 2002

(54) POLYURETHANE REACTION SYSTEM HAVING A BLOCKED CATALYST COMBINATION

(75) Inventors: Thomas E. Schoener, Columbus; Jeffrey B. Housenick, Ashland, both of OH (US)

(73) Assignee: Ashland Chemical, Columbus, OH (US)

( * ) Notice: Subject to any disclaimer, the term of this patent is extended or adjusted under 35 U.S.C. 154(b) by 0 days.

(21) Appl. No.: 08/321,460

(22) Filed: Oct. 11, 1994

Related U.S. Application Data

(63) Continuation of application No. 08/125,408, filed on Sep. 22, 1993, now abandoned.

(51) Int. Cl.$^7$ .............................................. B32B 31/26
(52) U.S. Cl. ................. 156/307.1; 156/307.3; 156/307.7; 156/331.4; 156/331.7
(58) Field of Search .............................. 528/44, 45, 58; 156/307.1, 307.3, 307.7, 331.4, 331.7

(56) References Cited

U.S. PATENT DOCUMENTS

| | | | | |
|---|---|---|---|---|
| 4,341,689 A | * | 7/1982 | Doshi et al. ................ | 523/211 |
| 4,598,103 A | * | 7/1986 | Chang ........................ | 521/126 |
| 4,788,083 A | * | 11/1988 | Dammonn et al. ......... | 427/340 |
| 5,002,806 A | * | 3/1991 | Chung ..................... | 427/385.5 |
| 5,093,379 A | * | 3/1992 | Tiao et al. .................. | 521/129 |

\* cited by examiner

*Primary Examiner*—Stevan A. Resan
*Assistant Examiner*—D. Lawrence
(74) *Attorney, Agent, or Firm*—Mueller and Smith, LPA

(57) ABSTRACT

Disclosed is a polyol/polyisocyanate adhesive system having an isocyanate component and a catalyzed component which form a heat-cured composition when admixed and heated above a threshold temperature. The catalyzed component has a hydroxyl-functional component catalyzed with a catalyst combination of a heat-activatable amine or amine-like catalyst which is activated at temperatures above the threshold temperature, and an activatable complexed metal catalyst comprising the reaction product of tin or bismuth catalysts, or a mixture thereof, and a molar excess of a mercapto compound complexing agent. The catalyst combination is effective to maintain the processibility of the system at ambient temperatures while promoting the rapid cure of the system when heated above the threshold temperature.

28 Claims, 3 Drawing Sheets

POLYURETHANE REACTION SYSTEM HAVING A BLOCKED CATALYST COMBINATION

This is a continuation of application Ser. No. 08/125,408 filed on Sep. 22,1993, now abandoned.

BACKGROUND OF THE INVENTION

The present invention relates to polyol/polyisocyanate adhesive compositions and more particularly to such compositions having a unique catalyst system which provides the heretofore unknown combination of a relatively long pot life, i.e., open, reaction, working or cure time, and a relatively fast "on demand" or "trigger" cure.

Reactive urethane-based adhesives have proved suitable for a wide variety of applications including the laminating of structural or decorative panels. Indeed, materials as diverse as coated and treated steel, aluminum, isocyanate foam, fiberglass-reinforced plastics, polystyrene foam, cement board, luan and particleboard may be bonded or joined using urethane adhesives.

Conventional polyurethane adhesives generally are provided as a two-part system having a polyisocyanate base component and hydroxyl curative component which is typically a polyol. Application of such adhesive systems comprehends the mixture of the two components just before being applied to the adherends by tactile methods which include conventional roll coating, hot-nip processing, or meter mix dispensing, or by spray techniques utilizing, for example, a dual feed spray head. However, regardless of the application technique, equipment having plural delivery capability is mandated as the two adhesive components are inherently reactive with an attendant viscosity increase that precludes effective wetting of the adherends.

Although uncatalyzed, two-component urethane adhesives offer the advantage of an extended pot life at ambient temperature, such systems are of little commercial interest as having cure times that are prohibitively long even at elevated cure temperatures. Accordingly, to promote either the room-temperature or elevated-temperature curing of the system, a catalyst, typically an organometallo compound such as dibutyltin dilaurate or an amine or amine-like compound, generally is included with the polyol component. The catalyst must be included with the polyol component as inclusion with the isocyanate component presents the potential for a premature reaction with or gelation of the polyisocyanate. Unfortunately however, although the addition of conventional catalysts can effect the rapid conversion or cure needed for commercial production, catalyzing the adhesive system to such an extent so shortens pot life that the utilization of the aforementioned tactile or spay application techniques is precluded.

In the polyurethane coatings field, aliphatic urethane coating systems having both extended open times and fast "on demand" or "trigger" cures have been realized by the utilization of mercaptan complexing agents to block the activity of a tin or bismuth catalyst. As described by Linden in U.S. Pat. No. 4,753,825 and by Dammann et al. in U.S. Pat. No. 4,788,083, the disclosures of which are expressly incorporated herein by reference, such complexed catalysts remain essentially inactive until unblocked in the presence of an amine catalyst or heat. Although having a demonstrated commercial advantage in aliphatic urethane coating systems, the mercapto-tin or mercapto-bismuth complexed catalysts have failed to garner commercial acceptance as catalysts for urethane adhesive systems. In part, such failure can be attributed to the fact that urethane coatings typically comprise tin-catalyzed aliphatic polyisocyanates whereas urethane structural adhesives typically comprise aromatic polyisocyanates which generally require an amine or amine-like catalyst for a full cure. Indeed, although amine catalysts such as tertiary amines or the like have been suggested as activators for the above-mentioned mercapto-tin or mercapto-bismuth complexed catalysts, such activators are introduced as a third component. That is, the amine is provided in a vaporous form to which an applied polyisocyanate-polyol film coating is exposed for its curing. It is apparent, however, that such a technique is not amenable for the curing of structural adhesive films which, when applied in a bondline, lack the exposed surface area for a vapor permeation curing to be effective. Including such activators with the polyol component is not a viable option since the activator would prematurely unblock the complexed mercapto-tin or mercapto-bismuth catalyst and deleteriously affect the pot lift of the system when mixed.

In view of the foregoing, it may be seen that despite the improvements made in the curing of urethane coatings, similar improvements still have yet to be realized with respect to the curing of urethane adhesives. Accordingly, there remains a need for a urethane adhesive systems having both long open times and fast "on demand" or "trigger" curing. Such a need in the art is addressed by the present invention.

BROAD STATEMENT OF THE INVENTION

The present invention is directed to a novel polyol/polyisocyanate adhesive composition which affords the heretofore unknown combination of long open times and fast "on demand" or "trigger" cure times. The composition is catalyzed with a catalyst combination which displays a unique and unexpected synergy as neither of the catalyst components alone yields both a long open time and a fast cure time.

It is, therefore, an object of the present invention to provide a curable composition having components which form a catalyzed, heat-cured composition when admixed and heated above a threshold temperature. The composition comprises an isocyanate component and a catalyzed component having a hydroxyl-functional component. The hydroxyl-functional component is catalyzed with a catalyst combination comprising a heat-activatable amine or amine-like catalyst which is activated at temperatures above the threshold temperature, and an activatable complexed metal catalyst comprising the reaction product of a metal catalyst selected from the group consisting of tin catalysts, bismuth catalysts, and mixtures thereof, and a molar excess of a mercapto compound complexing agent.

It is also an object of the present invention to provide a method for curing a curable composition. The method entails providing a curable composition comprising the mixture of an isocyanate component and a catalyzed component. The catalyzed component has a hydroxyl-functional component catalyzed with a catalyst combination comprising a heat-activatable amine or amine-like catalyst which is activated at temperatures above the threshold temperature, and an activatable complexed metal catalyst comprising the reaction product of a metal catalyst selected from the group consisting of tin catalysts, bismuth catalysts, and mixtures thereof, and a molar excess of a mercapto compound complexing agent. The curable composition is heated above the threshold temperature to effect its curing by the activation of the amine or amine-like catalyst and the complexed tin catalyst.

Advantages of the present invention include the ability to formulate a urethane adhesive composition having a long pot life, but which is curable on demand by the introduction of heat. These and other advantages of the present invention will be readily apparent to those skilled in the art based upon the disclosure contained herein.

Figure 1:
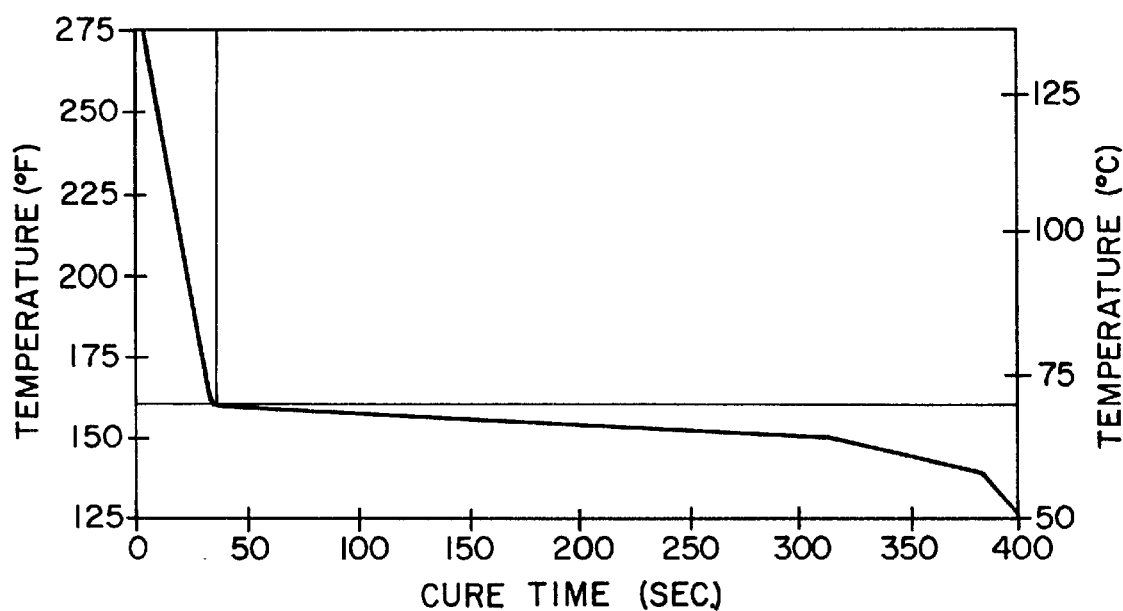
FIG. 1 is a graphical representation of the rate of reaction of the inventive adhesive system as a function of temperature.
Figure 2:
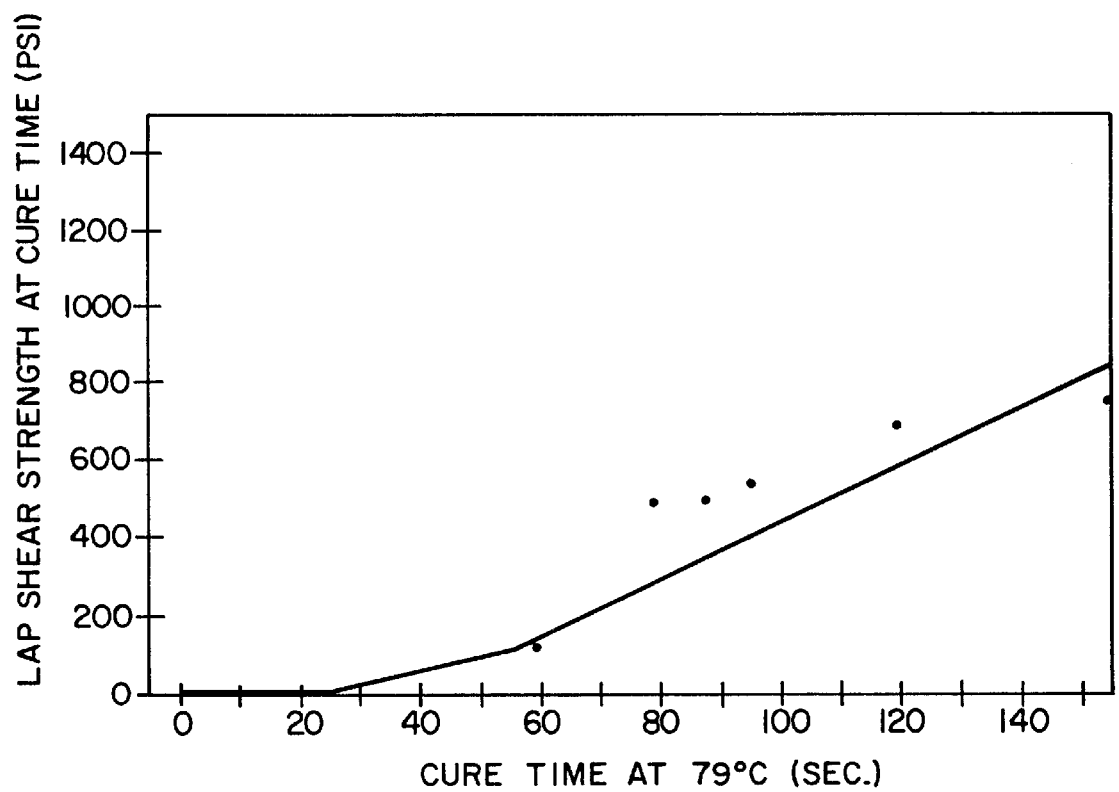
FIG. 2 graphically depicts the lap shear strength of the inventive adhesive system as a function of cure time for a cure temperature of 79° C.
Figure 3:
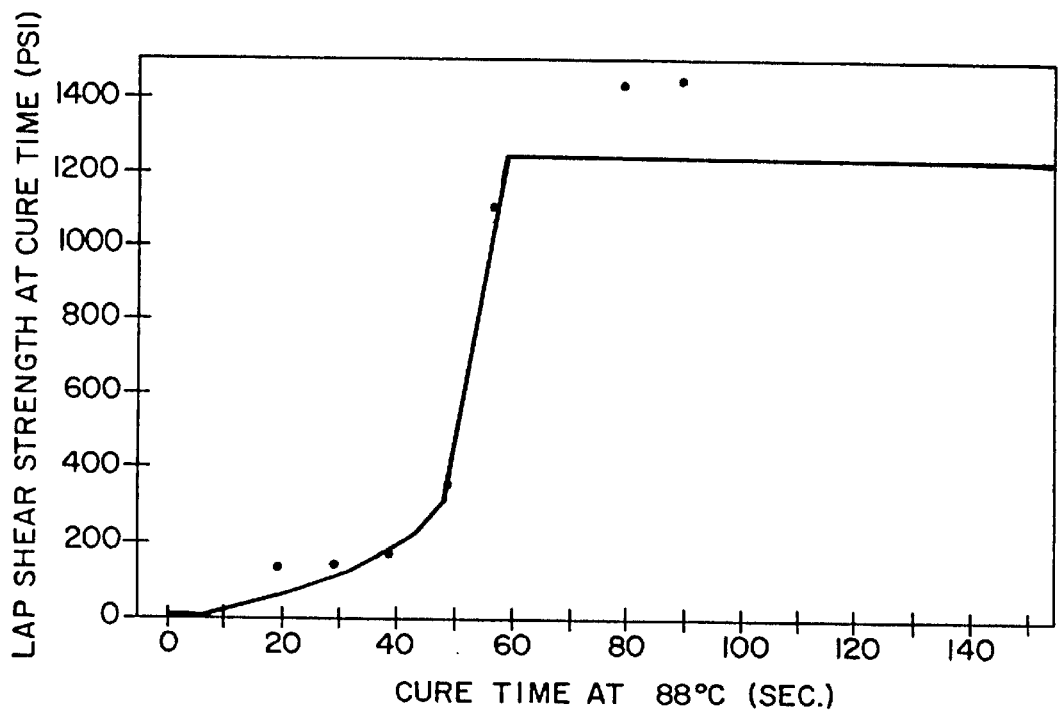
FIG. 3 graphically depicts the lap shear strength of the inventive adhesive system as a function of cure time for a cure temperature of 88° C.
Figure 4:
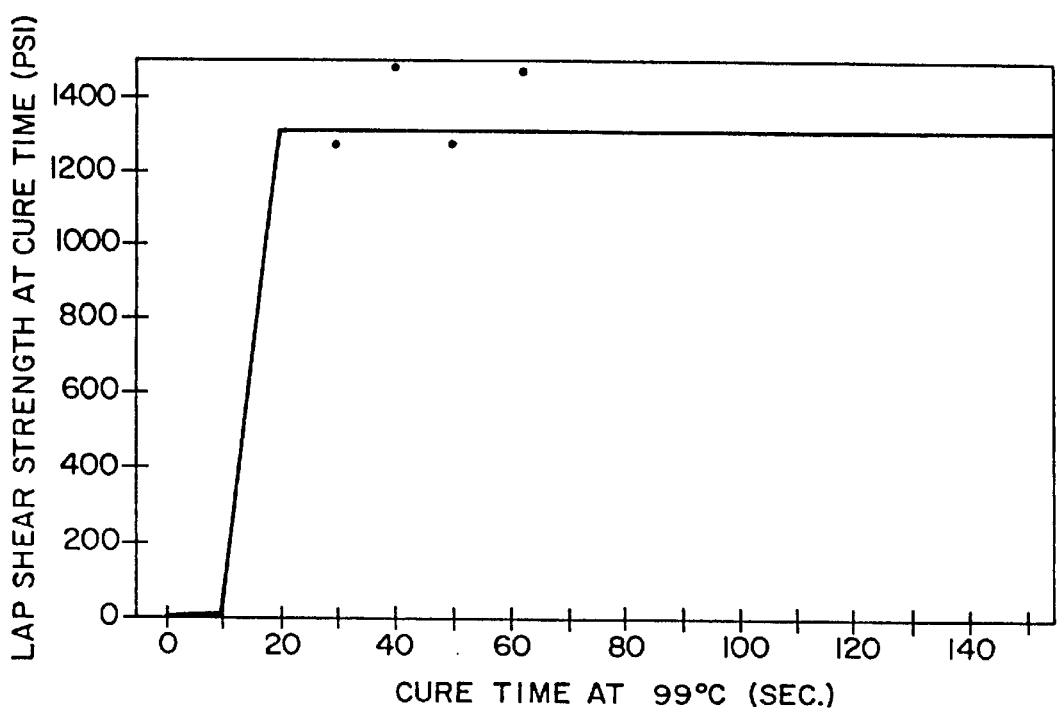
FIG. 4 graphically depicts the lap shear strength of the inventive adhesive system as a function of cure time for a cure temperature of 99° C.
Figure 5:
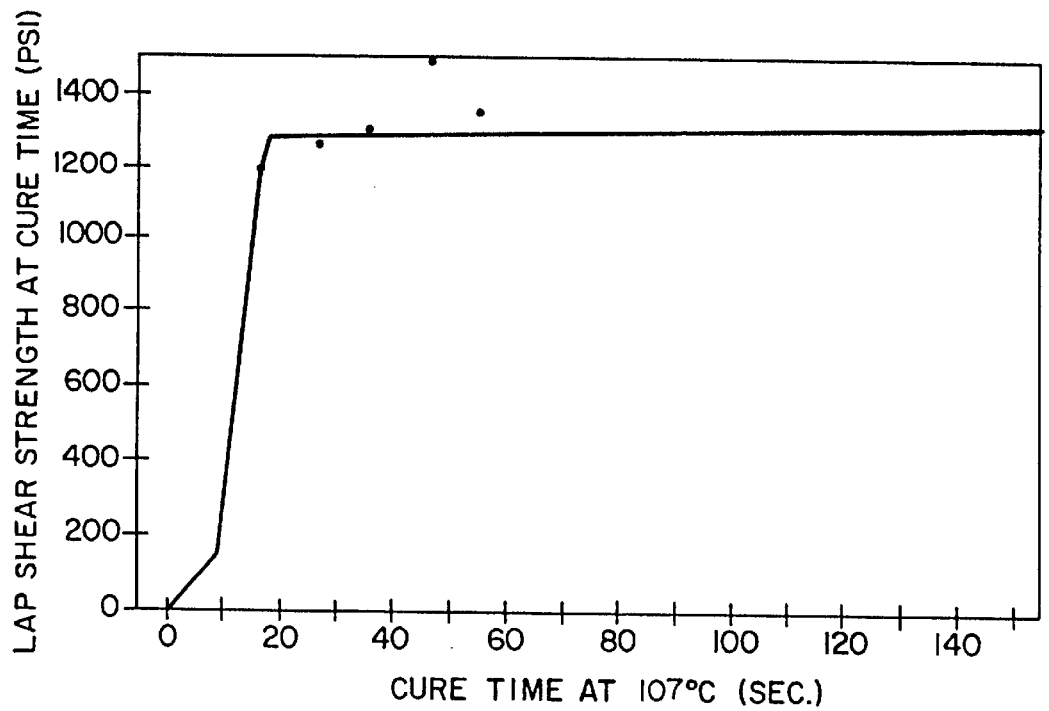
FIG. 5 graphically depicts the lap shear strength of the inventive adhesive system as a function of cure time for a cure temperature of 107° C.
Figure 6:
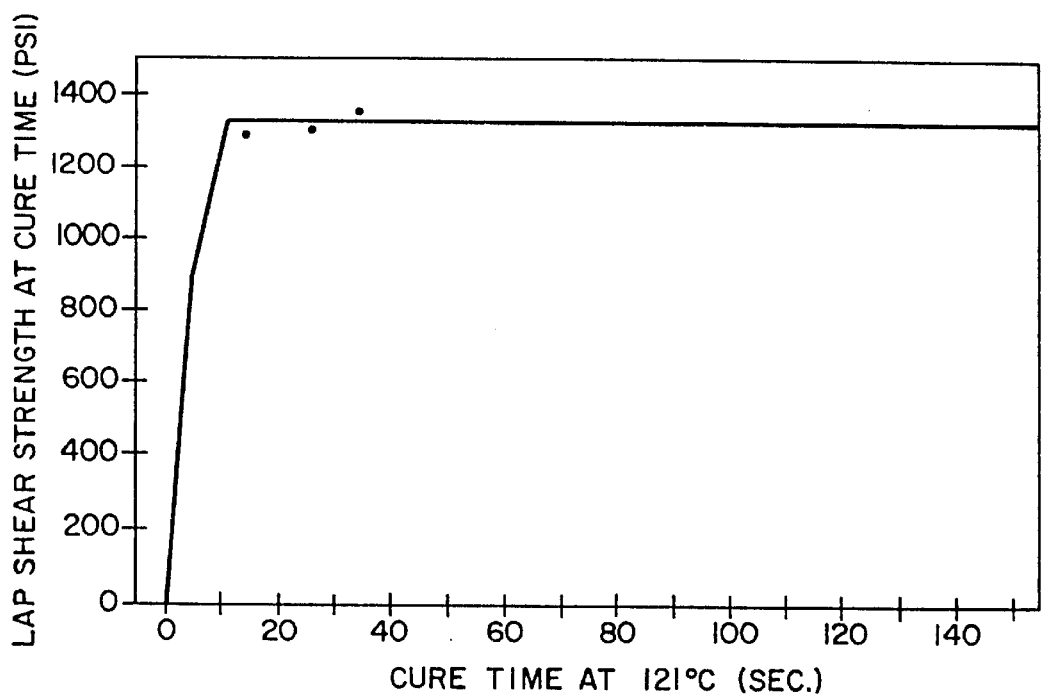
FIG. 6 graphically depicts the lap shear strength of the inventive adhesive system as a function of cure time for a cure temperature of 121° C.

The figures will be described further in connection with the following Detailed Description of the Invention.

DETAILED DESCRIPTION OF THE INVENTION

In the discourse to follow, the present invention will be described as embodied in a polyol/polyisocyanate adhesive composition. In this regard, it will be understood that the polyol component of the composition may include diols, triols, tetrols, and the like, and that the isocyanate component may include diisocyanates, isocyanate oligomers, polyisocyanates, and the like.

Considering then polyol/polyisocyanate adhesive compositions, as the polyisocyanate-polyol system is inherently reactive, urethane adhesives are generally provided as two-component systems which are delivered via plural component equipment. However, inasmuch as the urethane-forming reaction between the hydroxyl and isocyanate functional groups is generally of a rate below that which is commercially practical in, for example, panel laminating applications, urethane adhesive systems normally are catalyzed via the addition of a catalyst to the polyol component. Unlike urethane coating systems which generally comprise aliphatic polyisocyanates and, therefore, employ tin-based catalysts, urethane adhesive systems generally comprise aromatic polyisocyanates and, therefore, comprehend the addition of an amine or an amine-like catalyst. In this regard, tertiary amines such as triethyl amine, dimethyl ethyl amine, and the like, and amine-like compounds having aza-functionality have found commercial acceptance as catalysts for urethane adhesive systems and are selected on the basis of whether a long open or working time, or a fast cure time is desired.

Preferably, a urethane adhesive catalyst would promote both a relatively long open or working time and a relatively fast or even a "trigger" or "on demand" cure via the addition of heat or another activator such as a secondary catalyst. As described in U.S. Pat. No. 4,788,083, such a catalyst has been found for aliphatic urethane coatings. In principle, the catalyst described in U.S. Pat. No. 4,788,083 is characterized as "activatable" in the presence of heat or an activator and comprises the reaction product of a metal catalyst selected from a tin or bismuth catalyst and a molar excess of a mercapto or polyphenol complexing agent. However, when an amine, be it liquid or vaporous, is employed as the activator, U.S. Pat. No. 4,788,083 contemplates its addition as a third component for deblocking or otherwise activating the complexed metal catalyst.

Unexpectedly, it has been found that the curing of urethane adhesive compositions may be advantageously promoted while a relatively long working or open time is maintained by employing the activatable metal catalyst as described in U.S. Pat. No. 4,788,083 in association with a heat-activatable amine or amine-like catalyst. Although the utilization of a tin or other metal catalyst in an aromatic adhesive system would seem counterintuitive as it is well-known that amine catalysts are preferred for such systems, it appears as though the inventive catalyst combination functions synergistically. That is, and without being bound by theory, it is postulated that, at the appropriate temperature, generally from about 65° C. to about 85° C., the heat-activatable amine or amine-like catalyst and the activatable complexed metal catalyst, both of which can be characterized as being blocked or hindered, are synergistically unhindered or otherwise disassociated to, in turn, activate the complexed metal catalyst. The synergistic activation at an elevated temperature advantageously permits both the amine or amine-like catalyst and the complexed metal catalyst to be provided in the polyol component without risk of premature gelation or cure caused by the room temperature activation of the complexed metal catalyst by the amine or amine-like catalyst.

Thus, the present invention comprehends a curable composition having an isocyanate component and a catalyzed component which form a catalyzed, heat-cured composition when admixed and heated above a threshold temperature. As to the isocyanate component, it is preferred that, at least for adhesive compositions, the component includes an aromatic polyisocyanate such as diphenylmethane diisocyanate, toluene diisocyanate, or derivatives, polymers, or mixtures thereof. However, the isocyanate component may also include an aliphatic isocyanate such as methylenedicyclohexane diisocyanate, isophorone diisocyanate, hexamethylene diisocyanate, or derivatives, polymers, and mixtures thereof.

The hydroxyl-functional component preferably includes an aliphatic polyol such as a polyether diol, triol, or tetrol, or mixtures thereof. However, the component also may be formulated with mixtures of aliphatic and aromatic polyols, or a multi-functional, active hydrogen bearing polymer. Thus, in addition to polyether polyols, the hydroxyl-functional component may include derivatives of acrylates, esters, vinyls, castor oils, as well as polymers and mixtures thereof.

As to the preferred amine or amine-like catalyst, the class can be broadly described structurally as heat-activatable amines, and more particularly as aliphatic cyclic amines or amine-like compounds having, for example, aza-functionality. Functionally, the preferred class may be characterized as relatively inactive below a threshold temperature, but affecting the rate of the isocyanate-hydroxyl group urethane-forming reaction by at least an order of magnitude at temperatures above a threshold temperature. Such catalysts include 1,8-diaza-bicyclo(5,4,0) undecene-7 and 1,5-diazabicyclo(5,4,0)undec-5-ene.

The examples to follow, wherein all percentages and proportions are by weight, unless otherwise expressly indicated, are illustrative of the precepts of the present invention. However, although the catalysis of an aromatic reaction system is illustrated, it will be appreciated that systems including aliphatic isocyanates and particularly those including aliphatic polyols are within the purview of the present invention. Thus, the examples should not be construed in a limiting sense.

EXAMPLES

Example 1

To functionally illustrate the preferred class of amine or amine-like catalysts in terms of the desired catalytic effect, the cure characteristics of the inventive adhesive system were determined by a ladder study to obtain the reaction rate of the system at various temperatures. To facilitate the study, a master batch of adhesive composition was prepared as a two-component system comprising a polyisocyanate component and a catalyzed polyol component. The polyisocyanate component was formulated from AROWELD 400 polyurethane prepolymer (Ashland Chemical, Inc.): 45–50% urethane polymer including a diol (Poly G 20-112, polyether diol 1000 MW, Olin Chemical); 40% modified methylenediphenyl isocyanate (Isonate 2143L, Dow Chemical); and 10–15% poly(methylenephenylene) polyisocyanate (Mondur MRS, Miles Chemical). The polyol component was formulated from AROWELD 310 curative (Ashland Chemical, Inc.): 1–10% urethane polymer including an isocyanate (Isonate 2143L, modified methylenediphenyl isocyanate, Dow Chemical Co.); 60–70% polyol (Fomrez ET-3500, polyether triol 3500 MW, Witco); and 28–32% polyol (Plurocol PEP-550, polyether tetrol 500 MW, BASF). To the polyol component was added 0.5% of a heat-activatable amine-like catalyst, POLYCAT DBU (1,8-diaza-bicyclo(5,4,0)undecene-7, Air Products and Chemicals, Inc.), and 0.05% of a complexed metal catalyst, VIC 5054 (dibutyltin dilaurate complexed with a molar excess of glycol dimercaptopropionate, Ashland Chemical, Inc.). Aliquots of the polyisocyanate and the catalyzed polyol component then were admixed at a ratio of about 1:1 and cured isothermally at various temperatures. The time of cure for each was recorded as the time to form a hardened, solid mass. The following results were recorded.

TABLE 1

| Cure Temperature (° C.) | Time of Cure (seconds) |
|---|---|
| 52 | 400 |
| 65 | 330 |
| 79 | 50 |
| 93 | 30 |
| 107 | 20 |
| 121 | 14 |
| 135 | 8 |

The above-tabulated results are graphically portrayed in FIG. 1 as plot of time of cure versus cure temperature. As revealed in FIG. 1, two distinct cure profiles are represented. That is, at temperatures below a threshold temperature of about 65° C. to about 85° C., a profile dominated by the urethane reaction rate constant is evidenced. However, at temperatures above the threshold temperature, the drastic change in slope indicates a rate of reaction that is at least an order of magnitude faster than that influenced solely by the urethane reaction rate constant. It is postulated that this break in the reaction profile indicates the activations of the amine-like catalyst and the complexed metal catalyst. Thus, the data in FIG. 1 suggests the functional characteristics of the preferred class of amine or amine-like catalysts as remaining inactive at temperatures below a threshold or activation temperature, but effecting an almost instantaneous "on demand" or "trigger" cure at temperatures above the threshold temperature.

Example 2

To demonstrate the unique synergy between the selected amine or amine-like catalyst and the complexed metal catalyst in the present adhesive composition, a master batch of polyisocyanate and polyol component was formulated as described in Example 1. To aliquots of the polyol component were added various tin and amine-like catalysts, and combinations thereof. These aliquots were then were admixed with portions of the polyisocyanate component at a ratio of about 1:1 and cured at a constant temperature of 121° C. For each of the catalysts or catalyst combinations, both the room temperature open time, i.e., the gel time at 25° C., and the time to cure at a constant temperature of 121° C. were recorded. The following results were recorded.

TABLE 2

| Formula No. | Catalyst Amine/Tin | Weight % Amine/Tin | Open Time @ Room Temp. | Cure Time @ 121° C. |
|---|---|---|---|---|
| 5344-14-0 | XX/XX | 0.00/0.00 | 2 hours | 30 minutes |
| 5344-15-1 | DBU[a]/XX | 0.50/0.00 | 50 minutes | 2 minutes |
| 5344-6-1 | DBU/T-125 | 0.50/0.05 | 16.5 minutes | 8 seconds |
| 5344-15-2 | DBU/T-125[b] | 0.50/0.025 | 19 minutes | 8 seconds |
| 5344-15-3 | DBU/T-125 | 0.50/0.125 | 25 minutes | 15 seconds |
| 5344-15-4 | SA-1[c]/T-125 | 1.00/0.025 | 20 minutes | 20 seconds |
| 5344-16-1 | DBU/V-5054[d] | 0.50/0.10 | 55 minutes | 9 seconds |
| 5344-16-2 | DBU/V-5054 | 0.00/0.10 | 1.5 hours | 15 minutes |

[a]POLYCAT DBU (1,8-diaza-bicyclo(5,4,0)undecene-7, Air Products and Chemicals, Inc.)
[b]DABCO 125 (tetravalent organotin catalyst, Air Products and Chemicals, Inc.)
[c]POLYCAT SA-1 (1,5-diazabicyclo(5,4,0)undec-5-ene with an organic acid blocker/complex, Air Products and Chemicals, Inc.)
[d]VIC 5054 (dibutyltin dilaurate complexed with a molar excess of glycol dimercaptopropionate, Ashland Chemical, Inc.)

As the above-tabulated data demonstrate, neither the amine or amine-like catalyst (POLYCAT DBU), nor the complexed metal catalyst (VIC 5054), alone affords both a relatively long open time and a relatively short "on demand" or "trigger" cure. However, in combination according to the precepts of the present invention, these catalysts synergistically maintain the relatively slow urethane reaction rate at ambient or slightly elevated temperatures while greatly promoting the reaction at elevated temperatures.

Example 3

The versatility of the inventive adhesive system was demonstrated by characterizing its post cure strength build. Again, a master batch of a polyisocyanate component and a catalyzed polyol component was formulated as described in Example 1. The components were mixed in a static mixer and dispensed at a volumetric ratio of 1:1 onto 2.54 cm² areas of 10.16 cm by 2.54 cm E-coated steel coupons. A second steel coupon was placed over the adhesive-coated coupons to form lap shear specimens having a 1-inch by 1-inch overlap joint. The specimens were placed in an oven for curing at five selected temperatures, 79° C., 88° C., 99° C., 107° C., and 121° C., and several cure times ranging from 10 seconds to 3 minutes. To end the cure time, the samples were quenched in water to slow any further reaction. The lap shear strengths of the samples at each temperature and for each cure time were obtained by tensile testing on an Instron testing machine. Duplicate samples were made for every cure time and temperature. The duplicate samples were cured overnight (20 hours) and then tensile tested to verify the full strength of the adhesive and to ensure that a full cure would be obtained at every time-temperature condition. The results are tabulated in Tables 3–8 and are graphically portrayed in FIGS. 2–7, respectively.

TABLE 3

| Cure Time @ 79° C. (sec) | Lap Shear Strength at Cure Time (psi) | % of Full Strength* | Lap Shear Strength @ 20 h Post Cure |
|---|---|---|---|
| 10 | 0 | 0 | 1431 |
| 20 | 0 | 0 | 1449 |
| 30 | 10 | 0.7 | 1322 |
| 40 | 25 | 1.8 | 1426 |
| 50 | 72 | 5.5 | 1260 |
| 60 | 133 | −10.1 | 1430 |
| 80 | 492 | 37.3 | 1277 |
| 90 | 499 | 37.9 | 1338 |
| 100 | 533 | 40.4 | 1426 |
| 120 | 766 | 58.1 | 1438 |
| 180 | 747 | 56.7 | 1416 |

*Based on an average full strength value of 1320 psi.

TABLE 4

| Cure Time @ 88° C. (sec) | Lap Shear Strength at Cure Time (psi) | % of Full Strength* | Lap Shear Strength @ 20 h Post Cure |
|---|---|---|---|
| 10 | 0 | 0 | 1431 |
| 20 | 108 | 8.2 | 1449 |
| 30 | 109 | 8.2 | 1322 |
| 40 | 165 | 12.5 | 1426 |
| 50 | 397 | 30.1 | 1260 |
| 60 | 1149 | 100 | 1430 |
| 80 | 1431 | 100 | 1277 |
| 90 | 1477 | 100 | 1338 |
| 100 | not tested | 100** | 1426 |
| 120 | not tested | 100** | 1438 |
| 180 | not tested | 100** | 1416 |

*Based on an average full strength value of 1320 psi.
**assumed

TABLE 5

| Cure Time @ 99° C. (sec) | Lap Shear Strength at Cure Time (psi) | % of Full Strength* | Lap Shear Strength @ 20 h Post Cure |
|---|---|---|---|
| 10 | 2 | 0.2 | 1388 |
| 20 | 1233 | 100 | 1446 |
| 30 | 1237 | 100 | 1432 |
| 40 | 1480 | 100 | 1401 |
| 50 | 1235 | 100 | 1436 |
| 60 | 1452 | 100 | 1422 |
| 80 | not tested | 100** | 1466 |
| 90 | not tested | 100** | 1268 |
| 100 | not tested | 100** | not tested |
| 120 | not tested | 100** | not tested |
| 180 | not tested | 100** | not tested |

*Based on an average full strength value of 1320 psi.
**assumed

TABLE 6

| Cure Time @ 107° C. (sec) | Lap Shear Strength at Cure Time (psi) | % of Full Strength* | Lap Shear Strength @ 20 h Post Cure |
|---|---|---|---|
| 10 | 145 | 11 | 1416 |
| 20 | 1197 | 100 | 1398 |

TABLE 6-continued

| Cure Time @ 107° C. (sec) | Lap Shear Strength at Cure Time (psi) | % of Full Strength* | Lap Shear Strength @ 20 h Post Cure |
|---|---|---|---|
| 30 | 1220 | 100 | 1286 |
| 40 | 1258 | 100 | 1445 |
| 50 | 1456 | 100 | 1403 |
| 60 | 1282 | 100 | 1244 |
| 80 | not tested | 100** | not tested |
| 90 | not tested | 100** | not tested |

*Based on an average full strength value of 1320 psi.
**assumed

TABLE 7

| Cure Time @ 121° C. (sec) | Lap Shear Strength at Cure Time (psi) | % of Full Strength* | Lap Shear Strength @ 20 h Post Cure |
|---|---|---|---|
| 10 | 827 | 62.7 | 1283 |
| 20 | 1237 | 100 | 1413 |
| 30 | 1257 | 100 | 1295 |
| 40 | 1330 | 100 | 1446 |
| 50 | not tested | 100** | not tested |
| 60 | not tested | 100** | not tested |

*Based on an average full strength value of 1320 psi.
**assumed

As the above-tabulated data demonstrate and as is graphically depicted in FIGS. 2–6, at temperatures above about 79° C., the full shear strength of the adhesive system ultimately will be realized even with a heat induction time as short as 10 seconds. Indeed, at higher temperatures, i.e., 99° C. and above, the full shear strength of the adhesive is realized immediately upon an induction time of 20 seconds or less. Thus, the inventive adhesive system has a demonstrated processing flexibility which may be exploited in a variety of joining applications. For example, and considering for illustrative purposes panel laminating applications only, the processing flexibility of the inventive system lends itself to both hot-nip and hot-press processes.

We claim:

1. A method for bonding a pair of adherends with a curable adhesive composition, which comprises the steps of:

(A) providing an isocyanate component;

(B) providing a catalyzed component comprising:

(1) a hydroxyl functional component;

(2) a heat-activatable amine or aza catalyst which is activated at temperatures above a threshold temperature of about 65° C., said heat activatable amine or aza catalyst selected from the group consisting of: 1,8-diaza-bicyclo(5,4,0)undecene-7; 1,5-diazabicyclo(5,4,0)undec-5-ene; derivatives and mixtures thereof; and (3) an activatable complexed metal catalyst comprising the reaction product of a metal catalyst selected from the group consisting of tin catalysts, bismuth catalysts, and mixtures thereof, and a molar excess of a mercapto compound complexing agent;

(C) admixing said isocyanate component and said catalyzed component to form said curable composition;

(D) applying said curable adhesive composition to a bondline intermediate said adherends; and (E) bonding said adherends at said bondline by heating said curable adhesive composition above said threshold temperature to effect its curing by activating said amine or amine-like catalyst and said complexed metal catalyst.

2. The method of claim 1 wherein said isocyanate component comprises an aromatic isocyanate.

3. The method of claim 2 wherein said aromatic isocyanate is selected from the group consisting of toluene diisocyanate, diphenylmethane diisocyanate, and derivatives, prepolymers, and mixtures thereof.

4. The method of claim 1 wherein said isocyanate component comprises an aromatic isocyanate and an aliphatic isocyanate.

5. The method of claim 4 wherein said aromatic isocyanate is selected from the group consisting of toluene diisocyanate, diphenylmethane diisocyanate, and derivatives, prepolymers, and mixtures thereof, and said aliphatic isocyanate is selected from the group consisting of methylenedicyclohexane diisocyanate, isophorone diisocyanate, hexamethylene diisocyanate, derivatives, prepolymers, and mixtures thereof.

6. The method of claim 1 wherein said isocyanate component is selected from the group consisting of toluene diisocyanate, methylenedicyclohexane diisocyanate, isophorone diisocyanate, hexamethylene diisocyanate, diphenylmethane diisocyanate, derivatives, prepolymers, and mixtures thereof.

7. The method of claim 1 wherein said hydroxyl functional component comprises a mixture of polyols.

8. The method of claim 1 wherein said mixture of polyols comprises an aromatic polyol and an aliphatic polyol.

9. The method of claim 8 wherein said polyols are selected from the group consisting of derivatives of acrylates, ethers, esters, vinyls, castor oils, polymers and mixtures thereof.

10. The method of claim 1 wherein said hydroxyl functional component comprises a polyol, a multi-functional active hydrogen bearing polymer, or mixtures thereof.

11. The method of claim 10 wherein said polyol is selected from the group consisting of derivatives of acrylates, ethers, esters, vinyls, castor oils, polymers and mixtures thereof.

12. The method of claim 10 wherein said polyol is aliphatic.

13. The method of claim 1 wherein said tin catalyst is selected from the group consisting of stannous acetate, stannic oxide, stannous octoate, dibutyltin dioctoate, tin mercaptides, stannous citrate, stannous oxylate, stannous chloride, stannic chloride, tetra-phenyl tin, tetra-butyl tin, tri-n-butyl tin acetate, di-alkyl tin dicarboxylates, dimethyl tin dichloride, and mixtures thereof.

14. The method of claim 1 wherein said curable composition additionally comprises an organic solvent.

15. The method of claim 1 wherein the amount of tin from said tin catalyst ranges from about 0.0001 to about 1.0 percent by weight of said curable composition.

16. The method of claim 1 wherein the catalyst is tin and the molar ratio of mercaptan groups from said mercapto compound to said tin from said tin catalyst ranges from between about 2:1 to 500:1.

17. The method of claim 1 wherein said mercapto compound is selected from the group consisting of trimethylol propane tri-(3-mercapto propionate), pentaerythritol tetra-(3-mercapto propionate), glycol di-(3-mercapto propionate), glycol dimercapto acetate, trimethylol propane trithioglycolate, mercapto diethyl ether, ethane dithiol, thiolactic acid, mercapto propionic acid and esters thereof, thiophenol, thio acetic acid, 2-mercapto ethanol, 1,4-butanedithiol, 2,3-dimercapto propanol, toluene-3,4-dithiol, a,a'-dimercapto-para-xylene, thiosalicylic acid, mercapto acetic acid, dodecane dithiol, didodecane dithiol, di-thio phenol, di-para-chlorothiophenol, dimercapto benzothiazole, 3,4-dimercapto toluene, allyl mercaptan benzyl mercaptan, 1,6-hexane dithiol, 1-octane thiol, para-thiocresol, 2,3,5,6-tetrafluorothiophenol, cyclohexyl mercaptan, methylthioglycolate, mercapto pyridines, dithioerythritol, 6-ethoxy-2-mercaptobenzodines, dithioerythritol, 6-ethoxy-2-mercaptobenzothiazole, d-limonene dimercaptan, and mixtures thereof.

18. The method of claim 1 wherein said isocyanate component comprises an aromatic isocyanate.

19. The method of claim 1 wherein said hydroxyl functional component comprises an aromatic polyol.

20. The method of claim 1 wherein said catalyzed component contains about 0.5% by weight of said amine or amine-like catalyst.

21. The method of claim 1 wherein said catalyzed component contains from about 0.05% to about 0.10% by weight of said metal catalyst.

22. The method of claim 12 wherein the weight ratio of said heat-activatable amine or amine-like catalyst to said metal catalyst ranges from between about 5:1 to about 10:1.

23. The method of claim 22 wherein said catalyzed component contains about 0.5% by weight of said amine or amine-like catalyst.

24. The method of claim 1 wherein the weight ratio of said isocyanate component to said catalyzed component is about 1:1.

25. The method of claim 24 wherein said catalyzed component contains about 0.5% by weight of said amine or amine-like catalyst.

26. The method of claim 24 wherein said catalyzed component contains from about 0.05% to about 0.10% by weight of said metal catalyst.

27. The method of claim 24 wherein the weight ratio of said heat-activatable amine or amine-like catalyst to said metal catalyst ranges from between about 5:1 to about 10:1.

28. The method of claim 27 wherein said catalyzed component contains about 0.5% by weight of said amine or amine-like catalyst.

* * * * *